United States Patent [19]

Schwager

[11] 4,158,307
[45] Jun. 19, 1979

[54] GOVERNOR ROTOR ASSEMBLY

[75] Inventor: Frederic A. Schwager, Manhattan Beach, Calif.

[73] Assignee: Mattel, Inc., Hawthorne, Calif.

[21] Appl. No.: 925,254

[22] Filed: Jul. 17, 1978

[51] Int. Cl.² ............... G01D 13/14; G01D 13/28
[52] U.S. Cl. ........................... 73/535; 188/184
[58] Field of Search ............... 73/535; 188/180, 184, 188/185; 64/25; 274/1 D

[56] References Cited

U.S. PATENT DOCUMENTS

| 3,223,208 | 12/1965 | Ryan et al. | 188/184 |
| 3,245,688 | 4/1966 | Ryan | 274/1 A |

Primary Examiner—James J. Gill
Attorney, Agent, or Firm—John G. Mesaros; Max E. Shirk; Ronald M. Goldman

[57] ABSTRACT

A governor rotor assembly having a one piece rotor with a base portion generally perpendicular to the axis of rotation thereof with a parallel spaced cross member, the base portion having diametrically opposed tangentially extending U-shaped recesses formed therein with the open end thereof facing in the direction of rotation. The cross member is provided with similar diametrically opposed tangentially extending U-shaped recesses in facing relation and in general alignment with the U-shaped recesses of the base portion, with the cross member recesses facing opposite to the direction of rotation. A pair of counterweights have the pivot pins thereof configured for being pivotally received within the recesses by insertion therein by angularly positioning the pivot pin relative to a pair of facing recesses and then rotated until the pivot pin is generally parallel to the axis of rotation of the rotor.

4 Claims, 5 Drawing Figures

U.S. Patent    Jun. 19, 1979    4,158,307
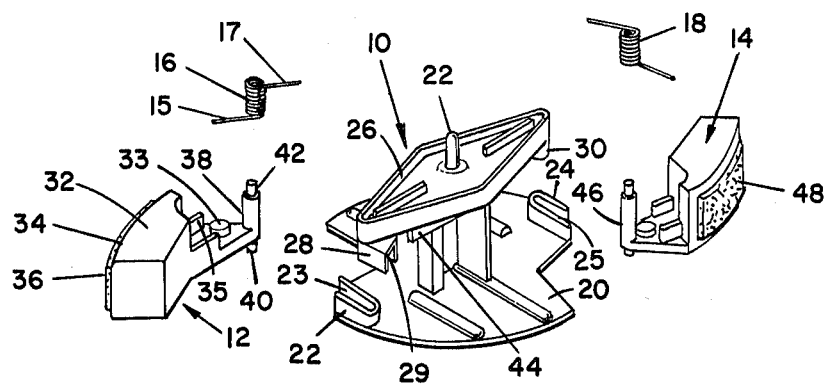

GOVERNOR ROTOR ASSEMBLY

BACKGROUND OF THE INVENTION

The background of the invention will be discussed in two parts:

1. Field of the Invention

This invention relates to governors, and more particularly to a governor rotor assembly.

2. Description of the Prior Art

Governors utilized to regulate the speed of rotating members are used widely. One such governor utilized for controlling the speed of a phonograph device for use in a doll or the like is shown and described in U.S. Pat. No. 3,245,688, such patent being assigned to the assignee of the instant invention. In a governor of this type, diminutive size is important to enable the governor to be utilized in a compact mechanism for reproducing sound.

Generally, a governor comprises a rotor rotatably coupled to the rotating member which speed is to be controlled, the rotor having pivotally mounted therein at least a pair of diametrically opposed counterweights which pivot outwardly an angle determined by the speed of rotation of the rotor. In the device of the aforesaid patent, the outer periphery of the counterweights are arcuately contoured and provided with a brake shoe which may be a strip of fabric such as felt, the brake shoe being configured for engaging a brake drum or housing generally in spaced proximate relation with the brake shoe. The pivot axes of the counterweights are generally parallel to the axis of rotation of the rotor with each pivot axis radially displaced the same distance usually in proximity to the perimeter of the rotor. During assembly of such prior art governor art rotors, the rotor was constructed in two pieces with each piece containing a pair of diametrically opposed cup shaped recesses for receiving an end of each of the pivot axes of the counterweights, thus requiring that a first end of the pivot pins of each of the counterweights be inserted in a first rotor piece, and with the counterweights maintained in this position, the second rotor piece was then assembled with the other ends of the rotor pieces engaging the cup shaped recesses thereof.

It is an object of the present invention to provide a new and improved governor rotor having a one-piece rotor.

It is another object of this invention to provide a new and improved governor rotor assembly which is compact, efficient and easy to assemble.

SUMMARY OF THE INVENTION

The foregoing and other objects of the invention are accomplished by providing a governor rotor assembly having a unitary or one-piece rotor with a shaft portion providing the axis of rotation and a base portion generally perpendicular to the shaft. The rotor is provided with a unitary cross member generally parallel to the base portion. the base portion is provided with a pair of diametrically opposed tangentially extending U-shaped recesses with the open ends thereof facing in the direction of rotation. The cross member is provided with a pair of diametrically opposed similarly configured U-shaped recesses in facing relation with the first pair of recesses, the bight portions of a facing pair of recesses being in general axial alignment for forming a pivot axis for receiving opposite ends of a pivot pin of a counterweight normally spring biased radially inwardly. The pivot pin of the counterweight is inserted into a pair of facing rcesses by angularly displacing the pivot pin, inserting one end into abutting relation with the bight portion of one recess and then rotating the other end through the opening of the facing recess until it abuts with the bight portion thereof.

Other objects, features and advantages of the invention will become apparent from a reading of the specification when taken in conjuction with the drawings in which like referenced numerals refer to like elements in the several views.

BRIEF DESCRIPTION OF THE DRAWINGS

FIG. 1 is an exploded perspective view of the rotor assembly according to the invention;

FIG. 2 is a side elevational view of the asembled rotor assembly in mounted relation within a housing shown in cross section;

FIG. 3 is plan view of the rotor assembly as viewed generally along line 3—3 of FIG. 2;

FIG. 4 is a side elevational view of the rotor assembly similar to FIG. 2 with the rotor assembly displaced 90° about its axis of rotation; and FIG. 5 is a cross sectional view taken generally along line 5—5 of FIG. 4.

DESCRIPTION OF THE PREFERRED EMBODIMENT

Referring now to the drawings and particularly to FIG. 1, the rotor assembly according to the invention includes a one-piece rotor generally designated 10, first and second counterweights generally designated 12 and 14 and first and second torsion springs 16 and 18 for biasing counterweights 12 and 14 respectively radially inwardly with the rotor assembled. The rotor includes a base portion 20 in generally perpendicular relation to the shaft 22 thereof which defines the axis of rotation of the assembled rotor. The base portion 20 has formed integrally therein a pair of diametrically opposed tangentially extending generally U-shaped recesses 22 and 24, the openings 23 and 25 respectivey thereof facing in the intended direction of rotation of rotor 10. Each of the recesses 22 and 24 is spaced radially from the shaft 22 the same distance.

The upper portion of the rotor 10 includes a cross member 26 in generally parallel relation with the base portion 20, the cross member 26 being generally configured as a pair of aligned oppositely extending arms. On the undersurface of cross member 26 are a pair of diametrically opposed generally U-shaped recesses 28 and 30, the recesses 28 and 30 having the open ends thereof facing in the direction opposite the direction of rotation. With the rotor 10 thus configured, each pair of facing recesses have the bight portions thereof generally aligned to form means for pivotally receiving one of the counterweights.

The counterweight 12 for example has an enlarged portion 32 with an arcuately configured face 34 having adhesively bonded thereto a piece of fabric such as felt 36 for acting as a brake shoe. Integrally formed with counterweight 12 is a pivot pin 38 configured for receiving the torsion spring 16 thereabout for biasing the counterweight 12 as will hereinafter be described.

With the one-piece rotor 10, the counterweight 12 is inserted in the following manner. The lower end 40 of pivot pin 38 is inserted through the opening 23 of recess 22 until the end 40 is abutting the bight portion thereof.

The pivot pin 38 is then positioned angularly so that the upper end 42 thereof may be inserted through the opening 29 whereupon it is rotated slightly until the end 42 is abutting the bight portion of the interior of recess 28 at which point of axis of pivot pin 38 is generally parallel to the axis of rotation of shaft 22. This assembly is accomplished with the torsion spring 16 encircling the main body portion of pivot pin 38. During this assembly the end 15 of torsion spring 16 is positioned between the stub 33 adjacent pivot pin 38 and the upwardly extending flange 35 adjacent thereto, both stub 33 and flange 35 being integrally formed with the counterweight 12, which is preferably constructed of a suitable metal. The other end 17 of torsion spring 16 is then rotated inwardly to engage tab 44 which is a downwardly depending tab formed on the undersurface of cross member 26 (see also FIGS. 2 and 3). The effect of the torsion spring 16 and 18, as in conventional governor rotors, is to bias counterweights 12 and 14 radially inwardly. The rotor 14 is configured identically to rotor 12 and includes a pivot pin 46 which is inserted for pivoting within the pair of aligned facing recesses 24 and 30 with torsion spring 18 encircling pivot pin 46 and assembled as previously described with respect to counterweight 12.

Referring now to FIGS. 2-4, the rotor 10 is shown with counterweights 12 and 14 assembled thereon, the rotor so assembled being mounted within a housing 50, the housing 50 having a generally circular cross section with the inner surface thereof in spaced proximate relation to the brake shoes or felt strips 36 and 48 on the outer perimeters of counterweights 12 and 14 respectively. As viewed in FIG. 3, the direction of rotation of rotor 10 is clockwise as indicated by the arrow adjacent shaft 22. As the speed of rotation of rotor 10 increases, centrifugal force urges counterweights 12 and 14 radially outwardly until the felt pads 36 and 48 urge against the inner surface of housing 50 to thereby limit the speed of the rotating member coupled thereto. During this rotation, since the lower ends of pivot pins 38 and 46 are abutting against the bight portions of the lower recesses 22 and 24 respectively formed in the base portion, the lower ends of the pivot pins are suitably restrained. In order to preclude the upper ends of pivot pins 38 and 46 from slipping out of the upper recesses 28 and 30 respectively, the base portion 20, as shown in FIG. 5, is provided with two pairs of guide ribs 52 and 54 for coacting with the lower planar surfaces of counterweights 12 and 14 respectively. As best illustrated in FIG. 5, the base portion 20 is generally disc shaped with cutouts 56 and 58 adjacent recesses 22 and 24 respectively to facilitate assembly of the counterweights 12 and 14 within the rotor 10.

As better illustrated in FIGS. 2 and 4, the guide ribs 52 and 54 are in spaced relation relative to the bottom surfaces of counterweights 12 and 14, these bottom surfaces being generally planar. Although these surfaces do not ordinarily contact guide ribs 52 and 54, as the rotor 10 rotates any resulting downward movement of the counter weights 12 and 14 would effectively stop at the upper edges of guide ribs 52 and 54.

As illustrated in FIGS. 2 and 4, the rotor 10 has the shaft 22 thereof rotatably mounted within housing 50 with opposite ends of shaft 22 being spherically contoured for being received within matingly configured cup-shaped bearing recesses 60 and 62 formed within housing 50. The lower end of shaft 60 is provided with a pulley portion 64 for receiving therein an O-ring 66 which is the drive belt coupled to the rotor 10 and encircling another pulley (not shown) of the rotating member, the speed of which is controllable by the governor.

The rotor assembly according to the invention is compact, a few pieces, is readily assembled, and can be utilized in compact phonograph devices for use with toys. While there has been shown and described a preferred embodiment it is to be understood that various other adaptations and modificatons may be made within the spirit and scope of the invention.

What is claimed is:

1. In a governor, the combination comprising:
 a housing having an inner surface generally circular in cross-section;
 first and second counterweight members, each of said counterweight members having a pivot pin adjacent an end thereof; and
 a one-piece rotor rotatably mounted within said housing, said rotor having a shaft, a base portion generally perpendicular to said shaft, and a cross-member spaced from and generally parallel to said base portion, said base portion being provided with a pair of diametrically opposed tangentially extending generally U-shaped recesses having the open ends thereof facing in the intended direction of rotation of said rotor, said cross-member having a second pair of diametrically opposed tangentially extending U-shaped recesses with the open ends thereof facing in a direction opposite the direction of intended rotation of said rotor, said second pair of recesses being in facing relation relative to said recesses in said base portion, one pair of facing recesses being so configured and so aligned for receiving therein a pivot pin of one of said counterweights with said pivot pin aligned generally parallel relative to said shaft whereby to enable said counterweight to be pivoted radially outwardly toward the inner surfaces of said housing during rotation of said rotor.

2. The combination according to claim 1 wherein each of said first and second counterweights is provided with a torsion spring member for normally biasing said counterweight radially inwardly.

3. The combination according to claim 2 wherein said base portion is generally disc shaped and provided with guide ribs in spaced proximate relation relative to a bottom surface of said counterweights.

4. The combination according to claim 3 wherein said shaft of said rotor includes a pulley portion for receiving a drive belt.

* * * * *